United States Patent
Pöllänen et al.

(10) Patent No.: US 11,665,754 B2
(45) Date of Patent: May 30, 2023

(54) WIRELESS COMMUNICATION NETWORK ENABLING COMBINED USE OF SEVERAL DIFFERENT NETWORK TECHNOLOGIES

(71) Applicant: AINA Wireless Finland Oy, Salo (FI)

(72) Inventors: Janne Pöllänen, Salo (FI); Juha Ylönen, Salo (FI); Pasi Auranen, Salo (FI); Tero Alén, Salo (FI)

(73) Assignee: AINA WIRELESS FINLAND OY, Salo (FI)

( * ) Notice: Subject to any disclaimer, the term of this patent is extended or adjusted under 35 U.S.C. 154(b) by 828 days.

(21) Appl. No.: 16/458,241

(22) Filed: Jul. 1, 2019

(65) Prior Publication Data

US 2021/0007162 A1  Jan. 7, 2021

(51) Int. Cl.

| | |
|---|---|
| *H04L 12/26* | (2006.01) |
| *H04W 76/14* | (2018.01) |
| *H04B 17/318* | (2015.01) |
| *H04W 76/50* | (2018.01) |
| *H04W 4/08* | (2009.01) |
| *H04W 4/10* | (2009.01) |
| *H04W 8/18* | (2009.01) |
| *H04W 84/08* | (2009.01) |

(52) U.S. Cl.
CPC .......... *H04W 76/14* (2018.02); *H04B 17/318* (2015.01); *H04W 4/08* (2013.01); *H04W 4/10* (2013.01); *H04W 8/186* (2013.01); *H04W 76/50* (2018.02); *H04W 84/08* (2013.01)

(58) Field of Classification Search
None
See application file for complete search history.

(56) References Cited

U.S. PATENT DOCUMENTS

| | | | | |
|---|---|---|---|---|
| 2007/0121564 A1* | 5/2007 | Petersen | ................. | H04W 8/06 370/338 |
| 2010/0218210 A1* | 8/2010 | Smelyansky | ..... | H04M 3/53333 379/48 |
| 2013/0291056 A1* | 10/2013 | Gaudet | ................... | H04L 63/10 726/1 |
| 2015/0121413 A1* | 4/2015 | Ramakrishnan | .... | G06F 16/9574 725/62 |

(Continued)

FOREIGN PATENT DOCUMENTS

WO   2016022038 A1   2/2016

*Primary Examiner* — Zewdu A Beyen
(74) *Attorney, Agent, or Firm* — Meunier Carlin & Curfman LLC (57) ABSTRACT

The present invention introduces a system, which comprises a telecommunication network structure, which can be called as an intelligent combination of Push-To-Talk (i.e. Direct Mode Operation, DMO) communication technique and cellular network application. The DMO can be set as a preferred choice if it is available. The subscriber devices retransmit (i.e. forward) the data message further until the message reaches the called subscriber terminal. The total cumulative hop between subscriber terminals may comprise both DMO-based hops and cellular connections. ID means are provided, and telemetric information can be sent from the terminals. The invention allows emergency information submissions from the terminals, and forced broadcast information from an administrator to the terminals as well. Dynamic Talk Groups (DTG) can be defined based on geographic locations on each registered user.

17 Claims, 2 Drawing Sheets

(56) References Cited

U.S. PATENT DOCUMENTS

| | | | |
|---|---|---|---|
| 2015/0189457 A1* | 7/2015 | Donaldson | H04M 3/56 |
| | | | 381/1 |
| 2015/0264554 A1 | 9/2015 | Addepalli et al. | |
| 2015/0350906 A1* | 12/2015 | Patil | H04W 40/02 |
| | | | 713/168 |
| 2016/0192439 A1 | 6/2016 | Phuyal et al. | |
| 2017/0280377 A1* | 9/2017 | Patil | H04W 12/033 |

* cited by examiner

WIRELESS COMMUNICATION NETWORK ENABLING COMBINED USE OF SEVERAL DIFFERENT NETWORK TECHNOLOGIES

FIELD OF THE INVENTION

In general, the present invention relates to wireless communication technology enabling voice communication between remote parties.

The present invention relates also to Push-To-Talk transmission applications and devices applying both direct mode communication and cellular network based communication.

BACKGROUND OF THE INVENTION

Wireless communication networks designed for professional use must be reliable in various use situations, such as for people locating either indoors within complex buildings and outdoors in a wide possible geographical area, and possibly in various, even shadowy conditions. Many different possibilities exist for creating a wireless communication network. Cellular networks are widely used and available for regular consumers i.e. end users in the general public but cellular networks can also be developed and used for various professionals. Various different generations exist in cellular network development history, such as 3G, 4G/LTE and the currently developed 5G. Even 6G networks have been planned. Generally, cellular systems comprise base stations and preferably directional antennas (or omnidirectional antennas in some situations) for creating desiredly sized cellular cells for wireless telecommunication service based on the environment (like urban or rural) and expected number of users for each cell. A mobile phone cellular network comprises also a core circuit switched network for handling voice calls and text, a packet switched network for handling mobile data, and a public switched telephone network to connect users (i.e. subscribers) to a wider telephone network.

Bluetooth is a wireless communication standard using short distance data transmission and reception, applied in 2.4 GHz frequency band. Bluetooth is standardized by the IEEE in IEEE standard 802.15.1. Bluetooth is well suitable for low power connection between two devices, where the connection can be a symmetrical connection between two Bluetooth devices, and especially with simpler configurations requiring just a connection between two devices, such as in gaming equipments, headsets or remote controlling devices.

Wifi or Wireless Local Area Networks (i.e. WLANs) fulfil the IEEE 802.11 standard, and this is in general applied in wireless connections requiring an access point, such as for wireless internet connection for user mobile devices in locally defined premises, such as in a hotel lobby, in company premises or in a cafeteria. A Wifi hotspot usually has a range of 20 meters indoors but even greater range outdoors. Wifi also uses the 2.4 GHz band but also 5 GHz frequency band is applicable.

Push-to-Talk (PTT) is a half-duplex communication technology, which allows instant voice messaging, when a button (or a tangent) is pushed. The technique can be used in one-to-one communication, but also in one-to-many users kind of communication. In PTT, one party is always on and there is no need for the A subscriber to dial a number of a B subscriber and wait for the other party to pick up the call. Initially this technique has been used in land mobile radios, i.e. walkie talkies used by various official personnel such as emergency services, police, security services, and even military (while the military of course applies more secure means of data transmission as well). The common denominator for the PTT transmission is a private and professionally intended and also reliable means for data communication in wireless manner. Furthermore, it is possible to download a walkie-talkie kind of app for a regular smartphone, which allows a traditional walkie-talkie type of connection with anyone across the world. This of course requires the user to download such an app first. Also critical functions of the society such as emergency services provided by medical services personnel and fire brigades, personnel in harsh working environments (construction sites or even mines) and personnel in official entities such as in border control, customs, security personnel, social and welfare personnel and also in critical industrial use, all may use PTT based communication for reliable data communication, which is not relying on regular cellular network coverage. In Finland, a radio network designed for official use is called VIRVE, which is a Terrestrial Trunked Radio (TETRA) network. TETRA allows a two-directional connection between the terminals, group calls as well, and also a Direct Mode Operation (DMO) is possible, where a network connection is not directly available. Respectively, in the USA, there is a Project 25 i.e. P25 i.e. APCO-25 radio standard designed for use by public safety organizations in North America. Thus, TETRA and APCO-25 can be called as systems applying traditional radio devices, designed for official use.

DMO means the ability of a TETRA (or an APCO-25) radio terminal to communicate directly with another TETRA (or an APCO-25) radio terminal, no matter whether the TMO (Trunked Mode Operation) network is present or not. In other words, the TMO uses TETRA (or APCO-25) mobile radios in combination with TETRA (or APCO-25) network infrastructure, while the DMO is TETRA (or APCO-25) radio communication between mobile radios without using a TETRA (or APCO-25) network infrastructure. DMO allows the device to reach the network by using another device through a DMO connection. In TETRA (or APCO-25) network, the routing from DMO to TMO in a TETRA (or an APCO-25) radio terminal requires a specific gateway apparatus.

The DMO operation can generally be defined as an ability of a radio device to communicate directly with another radio device without a presence of a network or even without a need to use an existing network for the communication purposes. The DMO operation is suitable indeed for devices and in locations, where the currently available network access is poor. The DMO offers a reliable, fast and also a secure way of communicating, especially for working environments discussed above in connection to the PTT principle.

Figure 1:
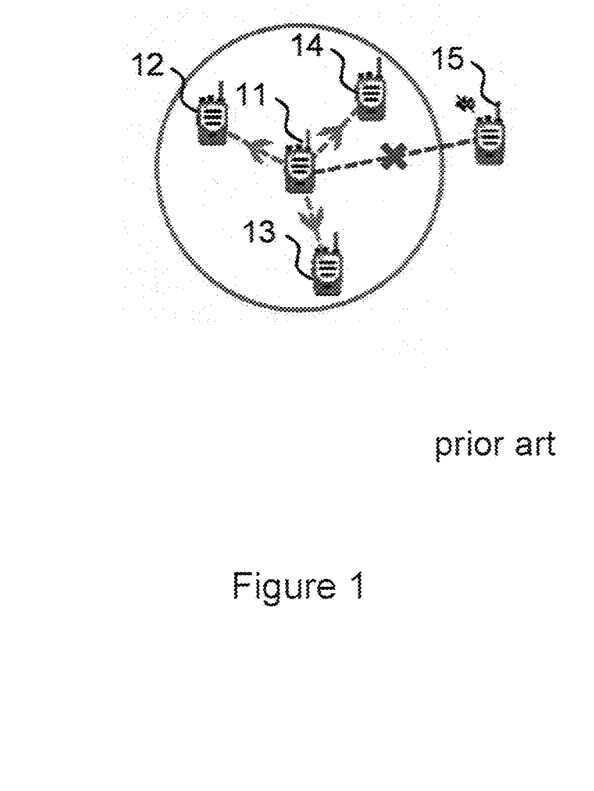
FIG. 1 illustrates the prior art situation with typical device-to-device DMO.

FIG. 1 illustrates such a situation, where several devices capable of Direct Mode Operation (DMO) are shown within an inner circle of FIG. 1, i.e. as the four devices 11-14, where the middle terminal 11 is capable to communicate with any of the three terminals 12, 13, 14, because they all support the DMO technique, and the distance from the middle terminal 11 to the terminals 12, 13 or 14 is short enough for communicating with the DMO principle. The outermost terminal 15 outside the inner circle is a device applying also the Direct Mode Operation, but the outermost terminal 15 locates outside the direct communication range from the middle terminal 11. In such a typical device-to-device DMO, the middle terminal 11 is able to send a message to the other users (i.e. terminals 12-14) in the DMO mode, which within this range will be able to receive this message. For the out-of-range user terminals (such as the outermost terminal 15) to join the line of communication, a DMO repeater would be needed to extend the DMO middle terminal 11 coverage. A DMO repeater would be needed e.g. in the functionality of terminal 14. Without the DMO repeater, the range of communication from the middle terminal 11 is a relatively short one, and it comprises only the single device-to-device connections between two DMO capable devices (in this example, the connections between the middle terminal 11 and any of terminals 12-14). This kind of situation leads to a very location-specific capability to communicate, which would be detrimental in any practical use situations, where the users are strongly mobile users due to their working nature (like security personnel and medical professionals e.g. in the ambulance force or fire brigade). Furthermore, the terminal users may often locate in tough and varying locations, such as indoors, even in a cellar, and outdoors in various locations.

The problem in prior art is thus that there is a need for longer range wireless communication, while maintaining reliability of the communication quality from the wireless terminal in e.g. emergency situations, and while also enabling application of strong user device authentication principles. The above discussed known telecommunication techniques have fulfilled only a part of the desired requirements. For professional use and for such personnel locating either indoors and outdoors and some even outside a cellular network reach in e.g. cellars of buildings, there is a need for finding a more reliable way and system for wireless communication.

SUMMARY OF THE INVENTION

The present invention discloses a method, a communication device, a communication system and a corresponding computer program product enabling a reliable, long-range communication means applicable e.g. for critical application areas for society or for other important communication situations in private and business use.

In other words, the present invention introduces a method for communicating a data message in a telecommunication network from a calling subscriber device to a called subscriber device in a network applying at least one of a Direct Mode Operation (DMO) and a cellular network, where the telecommunication network comprises at least two users with respective subscriber devices, wherein the method comprises the steps of:
  determining, in a controller, an optimal route for the data message from the calling subscriber device to the called subscriber device, which optimal route satisfies at least one desired criterion, and where the optimal route comprises at least one link hop through a cellular network, or at least one link hop through DMO, or both,
  transmitting the data message of a calling user from the calling subscriber device to a second device, and forwarding it further towards the called subscriber device along the determined optimal route, and
  presenting the received data message to the called user, which data message is received in the called subscriber device in either DMO operation or by a cellular network.

In an embodiment of the invention, the method further comprises the steps of:
  checking whether Direct Mode Operation (DMO) is available for the calling subscriber device or any forwarding intermediate device, and
  selecting DMO if it is available, and otherwise selecting a cellular network, for the respective transmitting or forwarding device.

In an embodiment of the invention, the method further comprises the step of:
  in case both the DMO and the cellular network are available for a transmitting subscriber device or a forwarding device, transmitting or forwarding the data message in both DMO and the cellular network simultaneously, resulting in redundant communication paths.

In an embodiment of the invention, the method further comprises the step of:
  in case a forwarding device which has received a DMO based message, is out of range for other DMO devices, selecting a cellular network as a route for retransmission for the forwarding device.

In an embodiment of the invention, the method further comprises the step of:
  a criterion for determining an optimal route comprises at least one of the following: the propagation time from calling subscriber device to called subscriber device, cost minimization, minimization of the number of DMO based radio path hops, and minimization of the cumulative distance of the combined DMO based hops between calling subscriber device and called subscriber device.

In an embodiment of the invention, the method further comprises the step of the calling subscriber device and/or the called subscriber device having a capability to read Near-Field-Communication (NFC) key tags in order to log in valid users with respective rights to use the telecommunication network.

In an embodiment of the invention, the method further comprises the step of:
  all desired, registered users of the telecommunication network are able to form a Dynamic Talk Group (DTG) for mutual communication, which is based on geographic locations on each registered user in the telecommunication network, thus allowing one or several Dynamic Talk Groups.

In an embodiment of the invention, the method further comprises the step of:
  providing an automatic emergency relay function (AERF), which in case of an emergency, allows all the users in the telecommunication network to forward an emergency message in a flooding mesh fashion, independently of the DTG definitions within the telecommunication network.

In an embodiment of the invention, the method further comprises the step of:
  providing a broadcast emergency message by an administrator to all devices in a predetermined geographical area, or providing a broadcast emergency message to all devices in the telecommunication network independent of their geographical location.

In an embodiment of the invention, the method further comprises the step of:
  a subscriber device is able to submit telemetric information along the telecommunication network concerning the subscriber device and its user, the telemetric information comprising at least one of the movement or location data of the subscriber device, or the battery capacity of the subscriber device lowering below a predetermined threshold.

In an embodiment of the invention, the method further comprises the step of:
a subscriber device which is configured to send telemetric data informing about a loss of the subscriber device, can be remotely logged off from the telecommunication network by the system administrator via the controller.

In an embodiment of the invention, the method further comprises the step of:
in a low battery capacity situation defined by the predetermined threshold of the calling subscriber device, deciding to use only the DMO mode for all communications no matter whether the cellular network is available or not.

In an embodiment of the invention, the method further comprises the step of:
providing geographically based access control, requiring a user having to locate in a predetermined geographical area in order to be able to log in and use the telecommunication network, no matter if the user has the NFC tag or other identification means.

In an embodiment of the invention, the method further comprises the step of:
selecting a private user channel mode to be used by default by a system administrator, where no messages are stored to any server.

In an embodiment of the invention, the telecommunication system comprises a local speech and telemetry recording functionality for emergency or other configurable situations, which functionality does not need any LTE or other cellular connectivity.

In an embodiment of the invention, the telecommunication system further comprises a team proximity indicator, which is based on Received Signal Strength Indicator (RSSI) and mesh-type of hop count to give indication of the team members' distance to the receiver.

In an embodiment of the invention, the method for communicating the data message in the telecommunication network from the calling subscriber device to the called subscriber device is obtained as a low latency digital speech service, where the low latency means times equal or less than 100 ms.

According to a second aspect of the invention, there is introduced a system for communicating a data message in a telecommunication network from a calling subscriber device to a called subscriber device in a network applying at least one of a Direct Mode Operation (DMO) and a cellular network, where the telecommunication network comprises at least two users with respective subscriber devices, wherein the system further comprises:
a controller, which is configured to determine an optimal route for the data message from the calling subscriber device to the called subscriber device, which optimal route satisfies at least one desired criterion, and where the optimal route comprises at least one link hop through a cellular network, or at least one link hop through DMO, or both,
the controller, which is further configured to transmit the data message of a calling user from the calling subscriber device to a second device, and forwarding it further towards the called subscriber device along the determined optimal route, and
the controller, which is further configured to present the received data message to the called user, which data message is received in the called subscriber device in either DMO operation or by a cellular network.

According to a third aspect of the invention, there is introduced a computer program product for communicating a data message in a telecommunication network from a calling subscriber device to a called subscriber device in a network applying at least one of a Direct Mode Operation (DMO) and a cellular network, where the telecommunication network comprises at least two users with respective subscriber devices, wherein the computer program product comprises code which can be executed in a processor of a data processing device, which is then directed to perform the following steps:
determining, in a controller, an optimal route for the data message from the calling subscriber device to the called subscriber device, which optimal route satisfies at least one desired criterion, and where the optimal route comprises at least one link hop through a cellular network, or at least one link hop through DMO, or both,
transmitting the data message of a calling user from the calling subscriber device to a second device, and forwarding it further towards the called subscriber device along the determined optimal route, and
presenting the received data message to the called user, which data message is received in the called subscriber device in either DMO operation or by a cellular network.

DETAILED DESCRIPTION OF THE INVENTION

The present invention introduces a telecommunication system, which comprises a telecommunication network structure, which enables use of at least two different network technologies for communication between two end users. A corresponding method and applicable computer program product are also part of the inventive concept. The system may automatically select the most appropriate network technology in each situation and concerning varying locations of users. Furthermore, the user does not have to manually select the type of communication or the network technology to be used. The system according to the present invention will perform such selections automatically.

In the following, LTE and DMO are often mentioned as two possible communication techniques, but the invention may use any cellular and non-cellular techniques without restricting merely into those two techniques.

Among the available network technologies, there may be cellular network technologies and technologies applying a Direct Mode Operation (DMO) principle. The present invention may automatically enable selecting and integrating (in other words, combining desiredly) the functionalities of e.g. LTE and DMO communication technologies based on a predefined algorithm, which may optimize the reliability and/or quality of connection for a given group of subscribers using the telecommunication system. In an embodiment, the subscribers are professional users such as personnel of an emergency service (fire department, ambulance personnel, police force), or business users or safety service users, such as security personnel, or other official or similar users such as customs workers, or janitorial services or workers in construction sites or in logistics companies, just to name some examples.

In other words, in an embodiment of the invention, the routing from DMO to TMO in a radio terminal part of the introduced network can occur in every device, where there is another data transmission means (e.g. technique or bus) available than just the Direct Mode Operation. This is a useful advantage of the introduced system and network.

In an embodiment, the connection between subscriber A (the calling subscriber) and subscriber B (the called subscriber) may at least partly apply a Direct Mode Operation. The DMO based wireless network technology may apply a so-called flooding mesh type of network. The network structure of the invention enhances the prior art's basic DMO technique discussed in FIG. 1 so that the system replicates the principle of a single device-to-device direct mode operation where desired, and combines it with cellular network connection where desired. Thus in other words, in addition to the replicated DMO principle within the network, also cellular networks can be used for e.g. better redundancy. LTE network is an example of an existing cellular network, like the earlier developed 3G as well, but any existing network such as the rapidly developing 5G network, is a possibility in this regard.

Also many other features and functionalities are added in the presented communication principle. These are discussed later in this specification.

Figure 2:
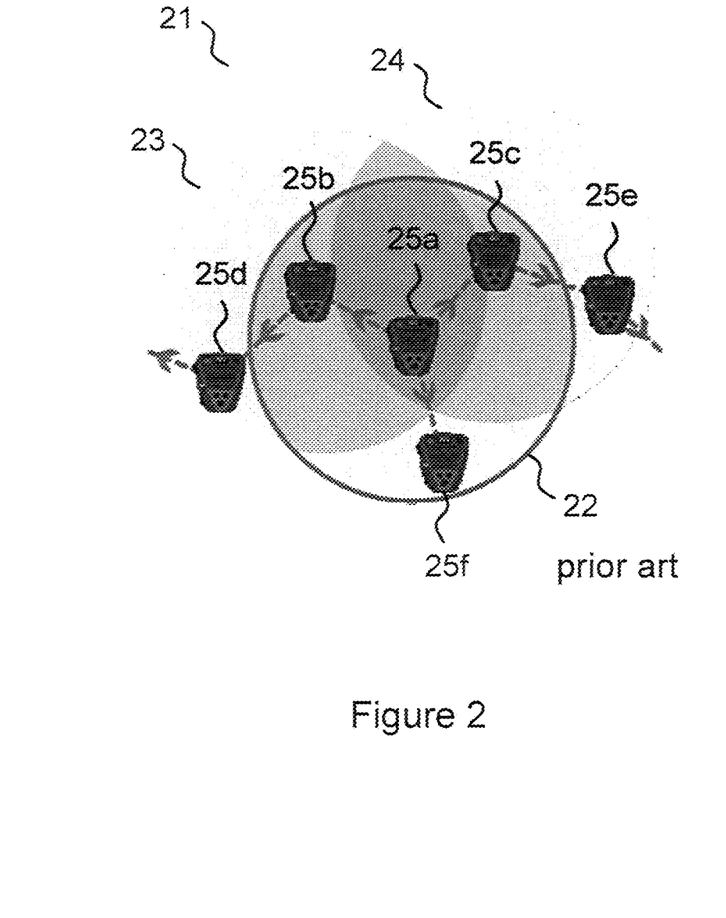
FIG. 2 illustrates a principle in an embodiment of the present invention, where a flooding mesh principle is obtained.

A main principle of the flooding mesh type of network applicable to the present invention is illustrated in FIG. 2. As such this principle is known in prior art. However, this principle is a useful part of the total process defined in this invention. All mobile terminals 25a-f are capable to DMO operation in this example. Let's pick up a terminal, which will initiate and send a message to other users, and thus, we select a middle terminal 25a of a first coverage circle 22. The first coverage circle 22 within the coverage radius comprises in this example three other devices, namely terminals 25b, 25c and 25f. When the message is sent from the middle terminal 25a, it can be set to reach one of the terminals 25b, 25c, 25f or a part of these terminals, or even all of these terminals either sequentially or simultaneously.

Now the useful functionality of the DMO capable terminals 25a-f is that when a terminal receives a message sent with DMO, it is capable to resend it further. This means that terminal 25b will now form a new central terminal in a second coverage circle 23, and terminal 25b is capable to resend the received message to the DMO capable devices locating in the second coverage circle 23. The terminal 25d locates within the second coverage circle 23, while it does not locate within the first coverage circle 22. This means that the message is resent to a terminal locating farther away from the middle terminal 25a than the first coverage circle 22.

Similarly, the process continues with the terminal 25c, which has received the initial message from the central terminal 25a. Terminal 25c will form a new central terminal within a third coverage circle 24. Terminal 25c is capable to resend the received message, and it will reach terminal 25e locating in the third coverage circle 24 but outside the first and second coverage circles 22,23. Now the message has reached all shown terminals 25a-f, and the flooding mesh principle can continue with the similar logic. The message may also bounce back to the terminal, which already had sent the message further. This process leads to a potentially very large network or mesh of devices, where the initially sent DMO message will reach the outer areas (concerning the starting point of terminal 25a) very quickly, resulting in a flooding manner of the message propagation in all directions along the chain of DMO terminals. The present invention may thus partly apply the flooding mesh network principle exemplified in FIG. 2.

Furthermore, in an embodiment of the present invention, the flooding mesh network is enhanced with a capability to use a dedicated cellular network available in the same physical region. The cellular network may follow any present cellular telecommunication standards, such as 4G, LTE or even 5G.

Figure 3:
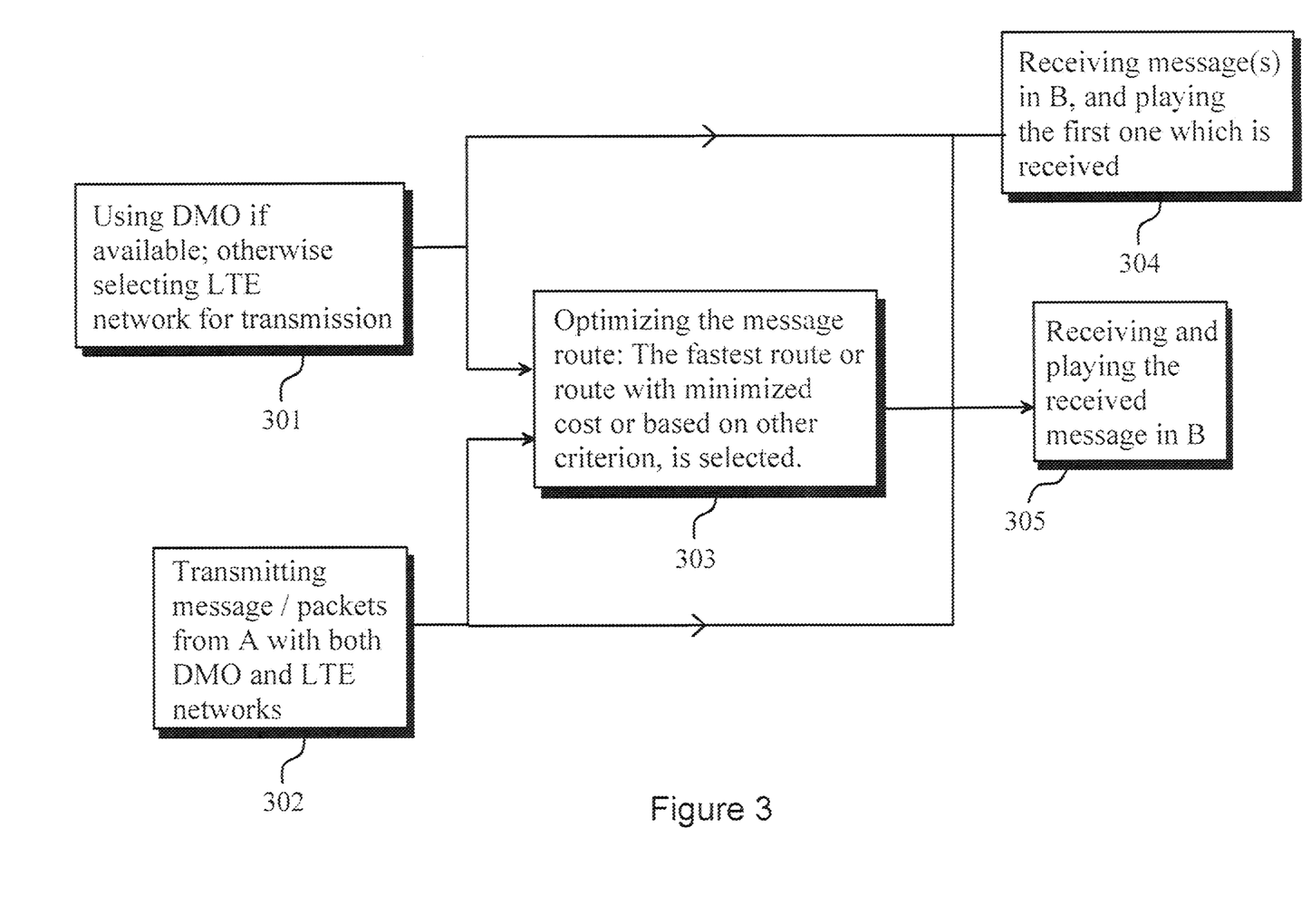
FIG. 3 illustrates a flow chart showing main elements in an embodiment of the present invention.

Concerning the process, how the message can be sent and propagated in a combination of a cellular network and a Direct Mode Operation "network", we refer to FIG. 3 illustrating such an embodiment of the invention through method steps. The telecommunication network comprises a group of wireless terminal devices. A sending user (i.e. terminal or subscriber "A") can be a professional in the field (such as a person working for emergency care in a medical emergency unit, such as an ambulance; or a security guard, just to name some of the possible examples). A receiving user (i.e. terminal or subscriber "B") can be a person e.g. in a central alarm receiving centre or in a control room, or another professional, with which the telecommunication contact is desired in the field environment. The system thus comprises a group of wireless terminal devices, and a central processing unit, which is capable to direct the transmission (e.g. voice messaging) between different devices. Besides a Direct Mode capability in at least part of the devices in the network, also a cellular network coverage can be present for at least part of the devices in the network. Subscribers A and B thus may have both a DMO based transmission capability and a cellular network capability, such as LTE, for instance. Still, in an embodiment, it is also possible that the system comprises only terminal devices with the Direct Mode Operation (DMO) capability only without an access to any cellular network. In a further embodiment, it is possible that the system comprises terminal devices which have both DMO and Bluetooth (BT) access capabilities for the communication. In that sense, the distinct phones, smartphones or tablets can be used by applying their BT connectivity. In this embodiment, the BT access of the terminals applies BT access points, which here form the cellular network disclosed elsewhere in this disclosure. In other words, the cellular network can be a BT connection between a Bluetooth access point and a user terminal device.

Next we go specifically to the example shown in FIG. 3. When e.g. a voice messaging process is initiated by subscriber A, the system can at first make a selection between a DMO operation and a cellular network, which is here exemplified by providing an LTE network coverage area in the area where the end user locates. Any other cellular network technology can be an option as well. FIG. 3 shows steps, which are performed automatically in the system, and thus, no manual actions by the end user is required concerning the selections. A first option is that the system may always use the DMO operation if it is available with the terminal used by the end user, and in case there are several DMO based hops in the connection route, all the devices along the route apply the DMO operation. Only if there is no DMO supported device group close in the vicinity of the end user, the system takes into use a secondary solution and picks a cellular network to be used (such as LTE). These two principles are shown in step 301 of FIG. 3. Another option is to anyway use both the DMO based device group (or network) and also a cellular network, and to apply a kind of redundant action in sending the desired (voice) message. In such an option, the (voice) message is transmitted with both the DMO network and the cellular network separately. The message will propagate in these two separate paths. Of course the sending time instants need not to be exactly the same; instead, the message can be first sent with the DMO network, and after its conclusion, via the cellular network. Of course, the order of the sending time instants can be vice-versa. The DMO message will propagate in the DMO capable network with the way depicted in FIG. 2; as a message flowing in a kind of a flooding mesh network. It will propagate efficiently and many routes for propagation are possible within the DMO device network.

If the DMO is used in the starting steps 301/302, the system may optimize the propagation route according to a given criterion 303 among the network of DMO capable wireless devices. The optimizing step 303 can be performed right after the transmission of the message has been initiated i.e. when the system knows the subscriber B in addition with the subscriber A. Alternatively, the optimizing step can be performed also beforehand, if the system just knows the receiver B, besides knowing the sender A. One possible criterion in the optimization can be the propagation time from sender A to receiver B. Costs can be taken into account alternatively or additionally, and one criterion can be cost minimization for a group of possible propagation routes. Also there can be a criterion, where the number of DMO based radio path hops is minimized. A criterion may also be that the cumulative distance of the combined DMO based hops between sender A and receiver B is minimized.

Route optimization 303 is an optimal step. If the route optimization is performed, the message will have a route which ensures at least one advantage, such as the quickest propagation time through the network of devices, for instance. In step 305, the propagated message through the optimized route is received and played in receiver B (i.e. subscriber B), who is the intended recipient.

There is an alternative way of propagating the message along the network, where no optimization of the propagation route needs to be performed. In this way, receiver B is able to track and detect incoming messages in a continuous manner through both DMO and LTE networks (or in general, through at least two different communication principles). When a message is received through either DMO reception or cellular network connection, it is played. If there are several transmissions for the same message as we have in step 302, the flooding mesh principle of the DMO network will propagate the message in several different routes towards (and also not towards) receiver B. At the same time, the cellular network such as LTE, is able to wirelessly carry the sent message to receiver B if the receiver is connected in the cellular network through a required base station connection. Both these two messages are received by receiver B, but in an embodiment shown in step 304, the first one which is received for the specific voice message in subscriber B, is played. In this way, there is redundancy within the transmission process, where the quickest message is played, but the same message is not played twice. The redundancy of course increases the reliability of the system comprising DMO based device network and the cellular network in propagating the voice message to subscriber B, even if some DMO based devices of the system are somehow out of order or out of reach. Another advantage is that the secondly arriving, same message is not played in vain, but instead, the control logic recognizes that it has already been received and played. Even if there is an instant lack of connection in the cellular network for some reason for receiver B, the transmitted message will reach receiver B through the flooding mesh network comprised by DMO operated devices (see FIG. 2). The reliability of the successful messaging from sender A to receiver B thus enhances also in that case.

An advantage of the step 301, where DMO is preferably used, and where the DMO is always used if it is available, means that the capacity of the LTE (or other) cellular network can be saved and it thus remains available for other cellular users.

In another embodiment of the invention, in case there is a gap in the propagation of the flooding mesh of the DMO propagated message as in FIG. 2, the system is able to forward the transmission to the cellular network even after one or several hops between the DMO operated devices. In other words, this means that the message will partly propagate between DMO capable devices, and partly as a cellular network transmission. This also means that "an intermediate DMO device", such as device 25*c* for instance, is able to connect to the wireless cellular network and forward the received DMO transmission into the cellular network. Optimization can also be part of this solution, even partially or concerning the total "hop length".

In yet another embodiment, identification security of the users has been enhanced and it can be made with several solutions either separately or in combination. Subscriber device A and/or subscriber device B can have a capability to read Near-Field-Communication (NFC) key tags in order to log in valid users with valid means, such as keycard for instance. The user authentication can be made strong, allowing safer entry and prohibiting non-allowed users to the communication network.

In an embodiment, all the desired users, who have an NFC key tag in possession, and thus are valid, registered users of the communication system, may form a user group i.e. a Dynamic Talk Group (DTG) for mutual communication. Furthermore, in another embodiment, there can be formed one or several Dynamic Talk Group(s) which are based on geographic locations on each valid user in the communication network. The geography based grouping may be preset to comprise users around a certain area, such as a building or a construction site. The grouping may also be based on functional tasks performed by the users, e.g. to form a group for all validly registered security guards working in a shopping center, just to name an example. A subscriber among a Dynamic Talk Group, is able to transmit voice messages, and it can be propagated to all other users in the same Dynamic Talk Group. The Dynamic Talk Group also means that the principle described in FIG. 2 will be applied only within the same DTG. In other words, the DMO based relaying of the message is propagated only along the devices with the same DTG. This means that all devices in the path, comprising subscriber A, the relaying devices, and subscriber B, are part of the same DTG comprising valid, NFC registered users.

In another embodiment, there can be defined an automatic emergency relay function (AERF). The AERF means that in case of an emergency, all the users in the group of DMO devices in the area are capable to relay an emergency message in a flooding mesh fashion, no matter how many DTG:s there are, and whether the device belongs to any specific DTG. In other words, the emergency message will propagate along each DMO device in the DMO range, and each device is capable to relay the message forward to new devices in the DMO range of that device. It can be said that this is the same situation as having a single universal talk group, which even includes the devices not properly registered by an authorized user. This functionality ensures that the emergency message will be relayed to each and every DMO device in the network. In some embodiments, the unregistered user devices can be cut off from receiving and playing the emergency message. This is practical if the emergency message is not crucial, and if the message comprises confidentially classified information.

Another type of emergency operation can be set by a system administrator. The administrator can type a message or select a predetermined emergency message to all devices in a certain geographical area. This means a broadcast emergency message, which is forced to be relayed to all devices in a given area. Alternatively, the emergency message can be broadcast to all devices in the network independent of their geographical location. This is an efficient manner to transmit crucial piece of information to everybody in the terminal network independent of their location, by the initiation of the system administrator.

In an embodiment, the subscriber device is able to submit telemetric information along the DMO and/or LTE networks concerning the device and its user (or in general, with at least two used communication techniques). This means that the device may e.g. sense if it remains fully immobile, thus determining that the device is not properly carried by the user, or the user has even lost his/her consciousness ("man down"-situation, or other kinds of emergencies or abnormal situations, such as a lost device). This is especially useful for dangerous tasks such as with the fire brigade personnel in the field. The movement data of the subscriber device, and/or the location data of the subscriber device can be a part of the telemetric information. Furthermore, the telemetric information can be sent, when the battery capacity of the device lowers below a certain threshold, revealing the situation of a low battery capacity. In this way, an alarm information relating to a low battery level can be sent to an administrator as well, in addition to the user him/herself within the terminal device itself (or on its screen, for instance).

In an embodiment, a device sending certain telemetric data informing e.g. about the loss of the device, can be remotely logged off and shut out of the network by the system (network) administrator. Also a dedicated, non-lost device can be logged out and shut off in an organized manner by this way from the network. This feature has an advantage that non-authorized usage is not possible anymore for such logged-out device. The loss of the device comprises the situations, where an accidental loss of the device has happened, or on the other hand, an intentional theft.

In an embodiment, relating to a low battery capacity situation (defined by a minimum threshold) of subscriber A, the system may then decide to use only the DMO mode for all communications because its power requirements for the terminal device are much lower. Cellular network connection, such as the LTE network connection, requires much higher power from the terminal, so advantageously, the cellular network is selectable to be used only when the battery level is over the crucial minimum threshold.

In a yet further embodiment, the geographical locations of the users (persons) are in important role in determining, who are able to use the DMO and/or LTE based communication system defined in the present invention. This can be called as "geographically based access control". In other words, the user has to locate in a predetermined geographical area in order to be able to log in and use the communication system, no matter if he/she has the NFC tag or other identification means. This means that the system administrator may define a physical area, comprising e.g. a shopping mall, a construction site, or a larger area of a town, where the system users must locate in order to log into and use the communication system. This kind of procedure also ensures that the DMO operation with shorter ranges is better applicable among the mesh of different user terminals in a restricted geographical area.

In a further embodiment, the present invention obtains the following result, which can be considered as an advantage as well. The communication principle according to the present invention results in almost real-time digital speech service, which provides low latency (e.g. equal or less than 100 ms) and thus, lip synch experience concerning the voice messages. This helps local users locating e.g. in confined spaces like in person carriers or indoors to understand the message, when the direct speech is mixed with the same audio stream coming out of many speaker microphones. In comparison, TETRA systems (and in the US, respectively, the P25 i.e. APCO-25 systems) have many times higher latency and the present invention solves the local voice intelligibility problem which users have had since moving out of analog radio systems. This is achieved using low latency RFIC without high level radio communication stacks or protocols.

In a further embodiment of the invention, a private user channel mode can be selected to be used by default. In such a mode, the system and the devices can be configured so that the sent messages are not stored to any server. Thus, e.g. officer pairs are able to have also private conversation (i.e. unofficial speech) like "bring me some coffee too", which they are not able to say over normal trunked systems. Channels can be configured by the system administrator, whether the messages are being recorded and where there are recorded if this is allowed.

In a further embodiment of the invention, the system comprises a local speech and telemetry recording functionality. This can be implemented e.g. as "a black box" for emergency or other configurable situations. This functionality does not need any LTE or other cellular connectivity to record etc. surrounding sounds and sensor data if the emergency situation has been triggered. Furthermore, tamper proof redundancy can be achieved using both recording modes (i.e. a cloud server over LTE and local recording) in normal PTT operations if needed. This is configurable by an administrator.

In a further embodiment of the invention, the system further provides a team proximity indicator, which is based on RSSI (Received Signal Strength Indicator) and mesh-type of hop count to give indication of the team members' distance to the receiver. It can be displayed as a simple indicator like field strength while receiving speech or a message indicating an emergency status of a team member. The team proximity indicator also helps the user to position himself and the device antenna better in bad reception cases like in complex buildings or while operating with greater distances outdoors.

The advantages of the present invention comprise that the method allows for long-haul communication distances even in emergency situations, while also providing a reliable manner for communicating in a field in various circumstances of various professional use. A major advantage of the invention is that the system is very easy to use for the professional or any other possible user because the selection process works automatically by the system itself. There is thus no need for manual switching between a trunk call state (i.e. a long distance call through a cellular network such as LTE, Tetra or Project 25 (i.e. P25/APCO-25)) or a direct mode state (i.e. DMO) with a device-to-device type of communication. The present invention allows using both these types of communication techniques even in parallel. The environmental conditions may change quickly, when the user moves e.g. from outdoors to indoors, and the system adapts to this as well and changes the mode automatically in such circumstances if necessary. This results in the functional advantage that the whole team using the wireless terminals is always able to communicate between one another, no matter if part of the team locates indoors, someone even in a cellar or basement, and the rest outdoors. This makes it highly applicable for various professional use scenarios.

The present invention is not restricted into the above disclosed examples and embodiments, but the invention may vary within the scope of the claims.

The invention claimed is:

1. A method for communicating a data message in a telecommunication network from a calling subscriber device to a called subscriber device in a network applying at least one of a Direct Mode Operation (DMO) and a cellular network, where the telecommunication network comprises at least two users with respective subscriber devices, wherein the method comprises the steps of:
   determining, in a controller, an optimal route for the data message from the calling subscriber device to the called subscriber device, wherein the optimal route satisfies at least one desired criterion, and where the optimal route comprises at least one link hop through the cellular network, or at least one link hop through DMO, or both,
   transmitting the data message of a calling user from the calling subscriber device to a second device, and forwarding the data message further towards the called subscriber device along the determined optimal route, and
   presenting the data message to the called user, wherein the data message is received in the called subscriber device in either DMO operation or by the cellular network,
   wherein the telecommunication network further comprises a team proximity indicator, which is based on Received Signal Strength Indicator (RSSI) and a hop count to give indication of the team members' distance to the called subscriber device, and
   in case both the DMO and the cellular network are available for the calling subscriber device or the second device, transmitting or forwarding the data message in both DMO and the cellular network simultaneously, resulting in redundant communication paths.

2. The method according to claim 1, wherein the method further comprises the steps of:
   checking whether Direct Mode Operation (DMO) is available for the calling subscriber device or the second device, and
   selecting DMO if it is available, and otherwise selecting the cellular network, for the calling subscriber device or the second device.

3. The method according to claim 1, wherein the method further comprises the step of:
   in case the second device which has received a DMO based message, is out of range for other DMO devices, selecting the cellular network as a route for retransmission for the second device.

4. The method according to claim 1, wherein the method further comprises the step of:
   a criterion for determining an optimal route comprises at least one of the following: the propagation time from calling subscriber device to called subscriber device, cost minimization, minimization of the number of DMO based radio path hops, and minimization of the cumulative distance of the combined DMO based hops between calling subscriber device and called subscriber device.

5. The method according to claim 1, wherein the method further comprises the step of the calling subscriber device and/or the called subscriber device having a capability to read Near-Field-Communication (NFC) key tags in order to log in valid users with respective rights to use the telecommunication network.

6. The method according to claim 1, wherein the method further comprises the step of:
   all desired, registered users of the telecommunication network are able to form a Dynamic Talk Group (DTG) for mutual communication, which is based on geographic locations on each registered user in the telecommunication network, thus allowing one or several Dynamic Talk Groups.

7. The method according to claim 6, wherein the method further comprises the step of:
   providing an automatic emergency relay function (AERF), which in case of an emergency, allows all the users in the telecommunication network to forward an emergency message in a flooding mesh fashion, independently of the DTG definitions within the telecommunication network.

8. The method according to claim 1, wherein the method further comprises the step of:
   providing a broadcast emergency message by an administrator to all devices in a predetermined geographical area, or providing a broadcast emergency message to all devices in the telecommunication network independent of their geographical location.

9. The method according to claim 1, wherein the method further comprises the step of:
   a subscriber device is able to submit telemetric information along the telecommunication network concerning the subscriber device and its user, the telemetric information comprising at least one of the movement or location data of the subscriber device, or the battery capacity of the subscriber device lowering below a predetermined threshold.

10. The method according to claim 9, wherein the method further comprises the step of:
    a subscriber device which is configured to send telemetric data informing about a loss of the subscriber device, can be remotely logged off from the telecommunication network by the system administrator via the controller.

11. The method according to claim 9, wherein the method further comprises the step of:
    in a low battery capacity situation defined by the predetermined threshold of the calling subscriber device, deciding to use only the DMO mode for all communications no matter whether the cellular network is available or not.

12. The method according to claim 5, wherein the method further comprises the step of:
    providing geographically based access control, requiring a user having to locate in a predetermined geographical area in order to be able to log in and use the telecommunication network, no matter if the user has the NFC tag or other identification means.

13. The method according to claim 1, wherein the method further comprises the step of:
    selecting a private user channel mode to be used by default by a system administrator, where no messages are stored to any server.

14. The method according to claim 1, wherein the telecommunication system comprises a local speech and telemetry recording functionality for emergency or other configurable situations, which functionality does not need any LTE or other cellular connectivity.

15. The method according to claim 1, wherein the method for communicating the data message in the telecommunication network from the calling subscriber device to the called subscriber device is obtained as a low latency digital speech service, where the low latency means times equal or less than 100 ms.

16. A system for communicating a data message in a telecommunication network from a calling subscriber device to a called subscriber device in a network applying at least one of a Direct Mode Operation (DMO) and a cellular network, where the telecommunication network comprises at least two users with respective subscriber devices, wherein the system further comprises:
  a controller, which is configured to determine an optimal route for the data message from the calling subscriber device to the called subscriber device, wherein the optimal route satisfies at least one desired criterion, and where the optimal route comprises at least one link hop through the cellular network, or at least one link hop through DMO, or both,
  the controller, which is further configured to transmit the data message of a calling user from the calling subscriber device to a second device, and forwarding the data message further towards the called subscriber device along the determined optimal route, and
  the controller, which is further configured to present the data message to the called user, wherein the data message is received in the called subscriber device in either DMO operation or by the cellular network,
  wherein the telecommunication network further comprises a team proximity indicator, which is based on Received Signal Strength Indicator (RSSI) and a hop count to give indication of the team members' distance to the called subscriber device, and
  in case both the DMO and the cellular network are available for the calling subscriber device or the second device, the controller is further configured to transmit or forward the data message in both DMO and the cellular network simultaneously, resulting in redundant communication paths.

17. A non-transitory computer readable medium comprising instructions that, when executed by a processor of a processing system, cause the processing system to communicate a data message in a telecommunication network from a calling subscriber device to a called subscriber device in a network applying at least one of a Direct Mode Operation (DMO) and a cellular network, where the telecommunication network comprises at least two users with respective subscriber devices, wherein the non-transitory computer readable medium comprises computer executable code when executed in a processor of a data processing device performs the following steps:
  determining, in a controller, an optimal route for the data message from the calling subscriber device to the called subscriber device, wherein the optimal route satisfies at least one desired criterion, and where the optimal route comprises at least one link hop through the cellular network, or at least one link hop through DMO, or both,
  transmitting the data message of a calling user from the calling subscriber device to a second device, and forwarding the data message further towards the called subscriber device along the determined optimal route, and
  presenting the data message to the called user, wherein the data message is received in the called subscriber device in either DMO operation or by the cellular network,
  wherein the telecommunication network further comprises a team proximity indicator, which is based on Received Signal Strength Indicator (RSSI) and a hop count to give indication of the team members' distance to the called subscriber device, and
  in case both the DMO and the cellular network are available for the calling subscriber device or the second device, transmitting or forwarding the data message in both DMO and the cellular network simultaneously, resulting in redundant communication paths.

* * * * *